(12) United States Patent
Lee et al.

(10) Patent No.: US 6,449,027 B2
(45) Date of Patent: Sep. 10, 2002

(54) IN PLANE SWITCHING MODE LIQUID CRYSTAL DISPLAY DEVICE AND METHOD FOR MANUFACTURING THE SAME

(75) Inventors: Kyung Ha Lee; Jeong Geun Kim, both of Kyoungki-do; Seung Yik Park, Seoul, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 63 days.

(21) Appl. No.: 09/740,558

(22) Filed: Dec. 19, 2000

(30) Foreign Application Priority Data

Dec. 22, 1999 (KR) .............................. 99-60328

(51) Int. Cl.[7] .......................................... G02F 1/1372
(52) U.S. Cl. ..................................................... 349/141
(58) Field of Search ......................................... 349/141

(56) References Cited

U.S. PATENT DOCUMENTS 6,281,953 B1 * 8/2001 Lee et al. .................... 349/141
6,300,995 B1 * 10/2001 Wakagi et al. ............... 349/141

\* cited by examiner

*Primary Examiner*—James Dudeh
(74) *Attorney, Agent, or Firm*—Ladas & Parry

(57) ABSTRACT

Disclosed is an in plane switching (IPS) mode LCD device and method for manufacturing the same. The IPS mode LCD device of the present invention includes a transparent insulating substrate, a gate bus line and a data bus line arranged in a cross fashion on the transparent insulating substrate to define a unit pixel area, a common electrode line disposed in parallel to the gate bus line while being spaced at most apart from the gate bus line in the unit pixel area, the common electrode line having a pair of shields respective disposed at both lateral edges of the unit pixel area, a thin film transistor disposed near an intersection of the gate bus line and the data bus line, a counter electrode arranged in the unit pixel area between the shield of the common electrode line and made of a transparent conductor, the counter electrode including a plurality of branches arranged in parallel to the data bus line, and a bar contacting the common electrode line and connecting respective one-side ends of the branches together, and a pixel electrode formed of a transparent conductor and including a pair of first electrode parts respectively overlapping with the shields of the common electrode line while extending in parallel to the data bus line, second electrode parts interposed each between adjacent ones of the branches included in the counter electrode, and a third electrode part contacting a part of the thin film transistor while connecting together respective one-side ends of the first and second electrode parts.

13 Claims, 5 Drawing Sheets

IN PLANE SWITCHING MODE LIQUID CRYSTAL DISPLAY DEVICE AND METHOD FOR MANUFACTURING THE SAME

BACKGROUND OF THE INVENTION

1. Field of the Invention

The invention relates to a liquid crystal display (LCD) device, and more particularly to an LCD device of in plane switching mode (IPS mode) with an enhanced aperture ratio and an enhanced transmittance, and a method for manufacturing the same.

2. Description of the Related Art

LCD devices have various advantages that they are light in weight, thin in thickness and low in power consumption, as compared to cathode ray tube (CRT) display devices. Therefore, such LCD devices are used in various terminals of information system and video units and the like, as a substitute for the CRT display devices. The LCD device typically adopts TN (Twist Nematic) mode as a LCD driving method. However, the widely utilized TN mode LCD device is disadvantageous in that its viewing angle is narrow. In order to eliminate the problem involved due to such a narrow viewing angle, therefore, plane switching (IPC) mode LCD devices have been proposed.

FIG. 1 shows a plan view of a conventional IPS mode LCD device. Its structure will now be described with reference to FIG. 1.

As shown in FIG. 1, a gate bus line 2 and a data bus line 6 are arranged in such a fashion that they cross each other, to define a unit pixel. A thin film transistor (TFT) 10 as a switching element is disposed near the intersection of the gate bus line 2 and the data bus line 6. As well known, the TFT 10 includes a gate electrode 2a, a channel layer (not shown), and source/drain electrodes 6a and 6b. A counter electrode 4 is also disposed in the unit pixel. The counter electrode 4 comprises a pair of first branches 4a disposed at the both sides of the unit pixel in parallel to the data bus line 6, second branches 4b interposed between the first branches 4a, and a bar 4c functioning as a common electrode line. The bar 4c extends in parallel to the gate bus line 2 while being spaced apart from the gate bus line 2 by a maximum distance in the unit pixel. The bar 4c connects respective one-side ends of the first branches 4a and second branches 4b together. A pixel electrode 8 is also disposed in the unit pixel. The pixel electrode 8 comprises a pair of first electrode parts 8a overlapping with respective first branches 4a of the counter electrode 4, second electrode parts 8b interposed between the second branches 4b of the counter electrode 4, and a third electrode part 8c connecting together respective ends of the first and second electrode parts 8a and 8b arranged near the gate bus line 2 while contacting the source electrode 6a of the TFT 10.

Meanwhile, although not shown, an upper substrate is disposed over the lower substrate having the above-described structure while being spaced apart from the lower substrate by a desired distance. A liquid crystal layer comprising a number of liquid crystal molecules is interposed between the upper substrate and the lower substrate.

FIG. 2 shows a cross-sectional view of the conventional IPS mode LCD device. Referring to FIG. 2, the fabrication of this device will be described.

A certain opaque metal film is deposited on a glass plate 1. The opaque metal film is patterned according to a known photo process, thereby forming a gate bus line (not shown) including a gate electrode 2a, and a counter electrode 4 including first and second branches 4a and 4b and a bar (not shown). A gate insulating film 3 is then deposited over the entire upper surface of the glass plate 1 with the gate bus line and the counter electrode formed. A channel layer 5 is formed on a portion of the gate insulating film 3 covering the gate electrode 2a. A metal film for source/drain is deposited on the channel layer 5 and the exposed portion of the gate insulating film 3. By patterning the metal film for source/drain, a data bus line 6 having a source electrode 6a and a drain electrode 6b is formed. Thus, a TFT 10 is fabricated. An ohmic contact layer (not shown) is interposed between the channel layer 5 and the source/drain electrodes 6a and 6b.

A protection layer 7 is deposited over the resultant structure obtained after completion of the above process, followed by an etching treatment to expose a part of the protection layer 7. A transparent metal film, such as an ITO film is deposited on the protection layer 7 and patterned to form a pixel electrode 8 having first, second and third electrode parts 8a, 8b, and 8c. The third electrode part 8c of the pixel electrode 8 is arranged to contact the source electrode 6a of the TFT 10.

Such an IPS mode LCD device has a structure in which its counter electrode and its pixel electrode for driving liquid crystals are arranged in parallel to each other on a single substrate. Therefore, an electric field generated between the counter electrode and the pixel electrode is parallel to the main surface of the substrate. Consequently, since the liquid crystal molecules are aligned in such a fashion that their long axis are oriented in parallel to the electric field, users can see the long axes of the liquid crystal molecules in any directions. Thus, the IPS mode LCD device has improved characteristics in terms of the viewing angle, as compared to TN mode LCD device.

However, the above-mentioned conventional IPS mode LCD device fails to satisfactorily improve the aperture ratio and transmittance because the counter electrode and the pixel electrode are formed of opaque metals. Moreover, the IPS mode LCD device can have a desired brightness only at an increased intensity of back light resulting in an increased consumption of electric power.

SUMMARY OF THE INVENTION

Therefore, in one aspect of the present invention, it is an object to provide an IPS mode LCD device with an enhanced aperture ratio and an enhanced transmittance.

Further, in another aspect of the present invention, it is an object to provide a method for manufacturing an IPS mode LCD device with an enhanced aperture ratio and an enhanced transmittance.

In accordance with one aspect, the present invention provides an in plane switching mode liquid crystal display device comprising: a transparent insulating substrate; a gate bus line and a data bus line arranged in a cross fashion on the transparent insulating substrate to define a unit pixel area; a common electrode line disposed in parallel to the gate bus line while being spaced at most apart from the gate bus line in the unit pixel area, the common electrode line having a pair of shields respective disposed at both lateral edges of the unit pixel area; a thin film transistor disposed near an intersection of the gate bus line and the data bus line; a counter electrode arranged in the unit pixel area between the shield of the common electrode line and made of a transparent conductor, the counter electrode including a plurality of branches arranged in parallel to the data bus line, and a bar contacting the common electrode line and connecting respective one-side ends of the branches together; and a pixel electrode formed of a transparent conductor and including a pair of first electrode parts respectively overlapping with the shields of the common electrode line while extending in parallel to the data bus line, second electrode parts interposed each between adjacent ones of the branches included in the counter electrode, and a third electrode part contacting a part of the thin film transistor while connecting together respective one-side ends of the first and second electrode parts.

In accordance with another aspect, the present invention provides a method for manufacturing an in plane switching (IPS) mode LCD device comprising steps of: depositing a first opaque metal film over a transparent insulating substrate; patterning the first opaque metal film to form a gate bus line including a gate electrode and a common electrode line disposed in parallel to the gate bus line while being spaced at most apart from the gate bus line in a unit pixel and having a pair of shields disposed at both lateral edges of the unit pixel; forming a gate insulating film on the transparent insulating substrate to cover the gate bus line and the common electrode line; forming a channel layer on the gate insulating part over the gate electrode; forming source/drain electrodes on the channel layer to form a thin film transistor (TFT) and to define a unit pixel, and forming a data bus line to be arranged in a cross fashion with respect to the gate bus line; forming, on a structure obtained after completion of the formation of the source/drain electrodes and the data bus line, a protection layer having contact holes, through which the common electrode line and the thin film transistor are partially exposed, respectively; depositing a transparent conductor on the protection layer; and patterning the transparent conductor to form a counter electrode including a plurality of branches arranged in parallel to the data bus line and a bar contacting the common electrode line and connecting respective one-side ends of the branches together, and a pixel electrode having a pair of first electrode parts overlapping the shields of the common electrode line while being parallel to the data bus line, second electrode parts each interposed between adjacent ones of the branches of the counter electrode, and a third electrode part connecting to respective one-side ends of the first and second electrode parts together and contacting a portion of the thin film transistor.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, an IPS mode LCD device and a fabrication method therefor according to a preferred embodiment of the present invention will be described in detail, with reference to the annexed drawings.

Figure 1:
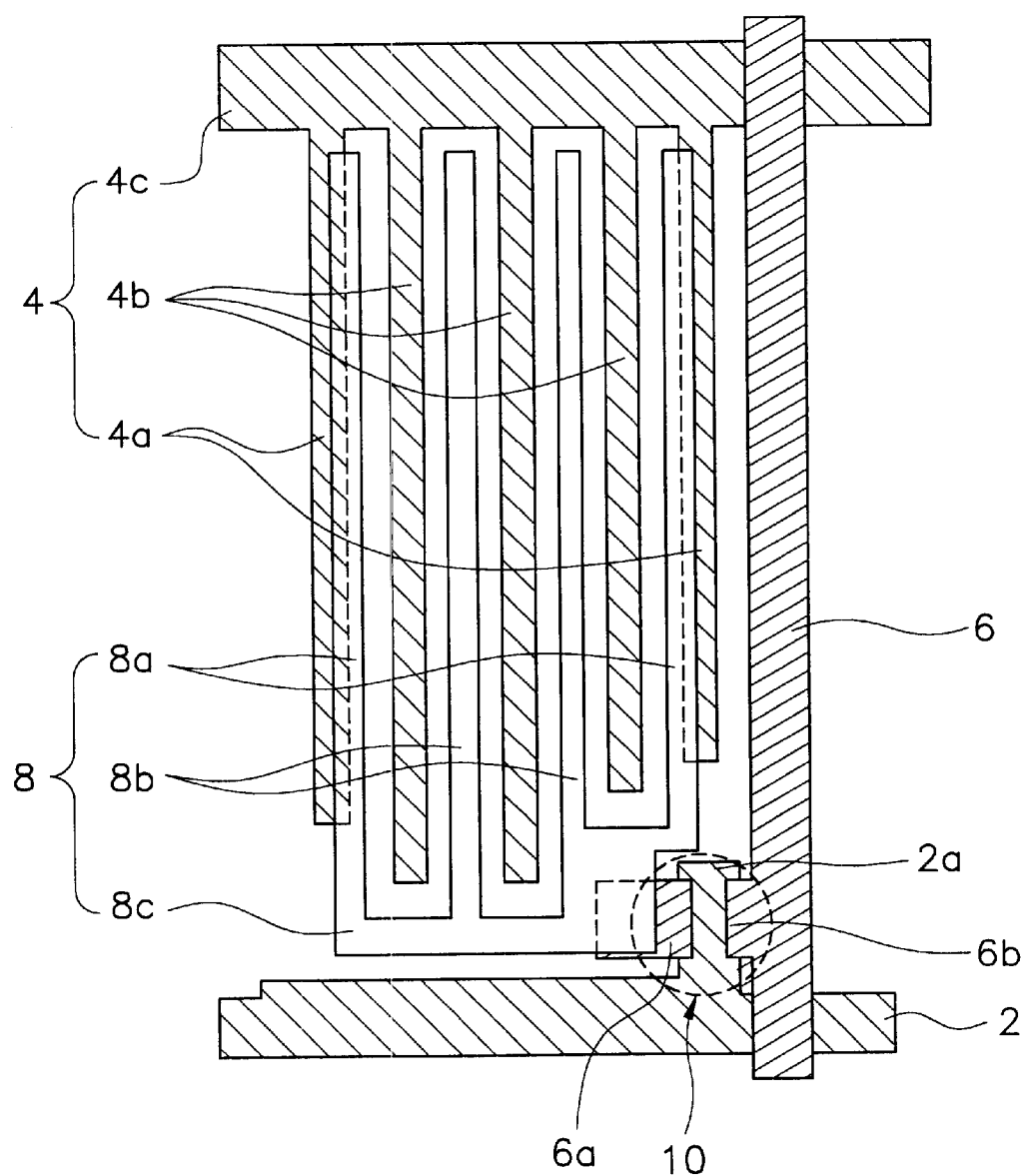
FIG. 1 is a plan view of a conventional IPS mode LCD device.
Figure 2:
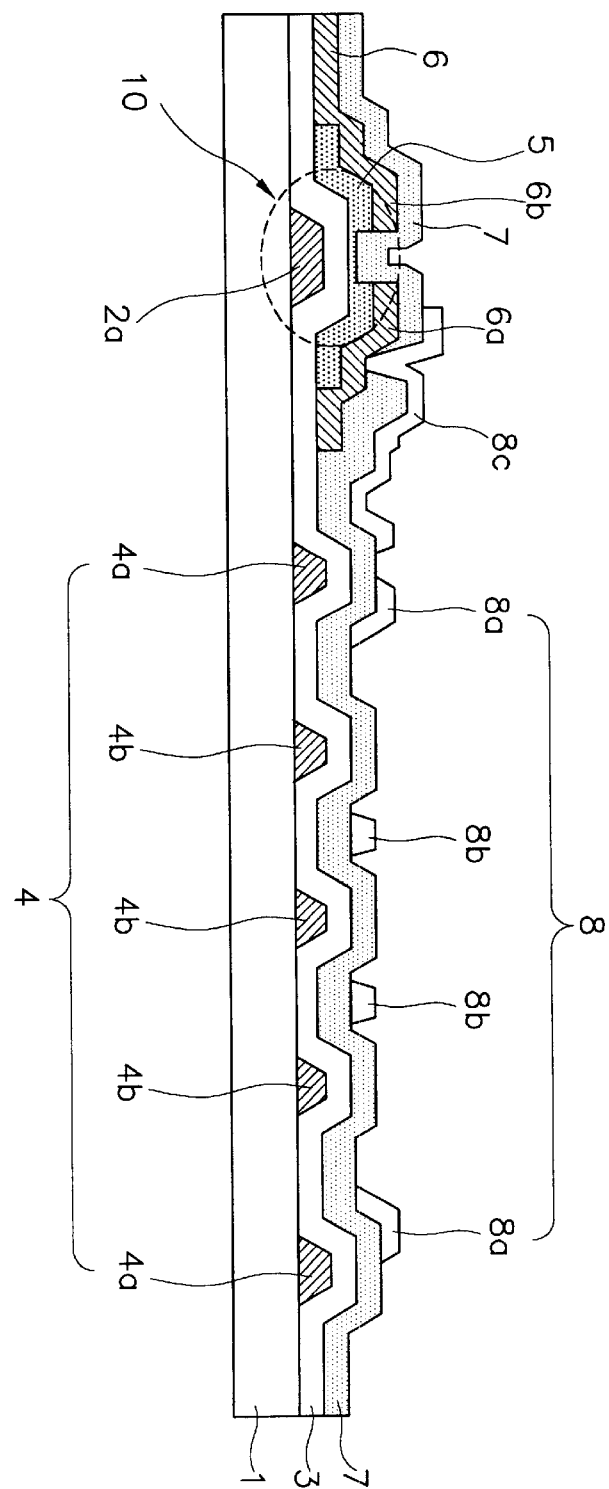
FIG. 2 is a cross-sectional view of the conventional IPS mode LCD device.
Figure 3:
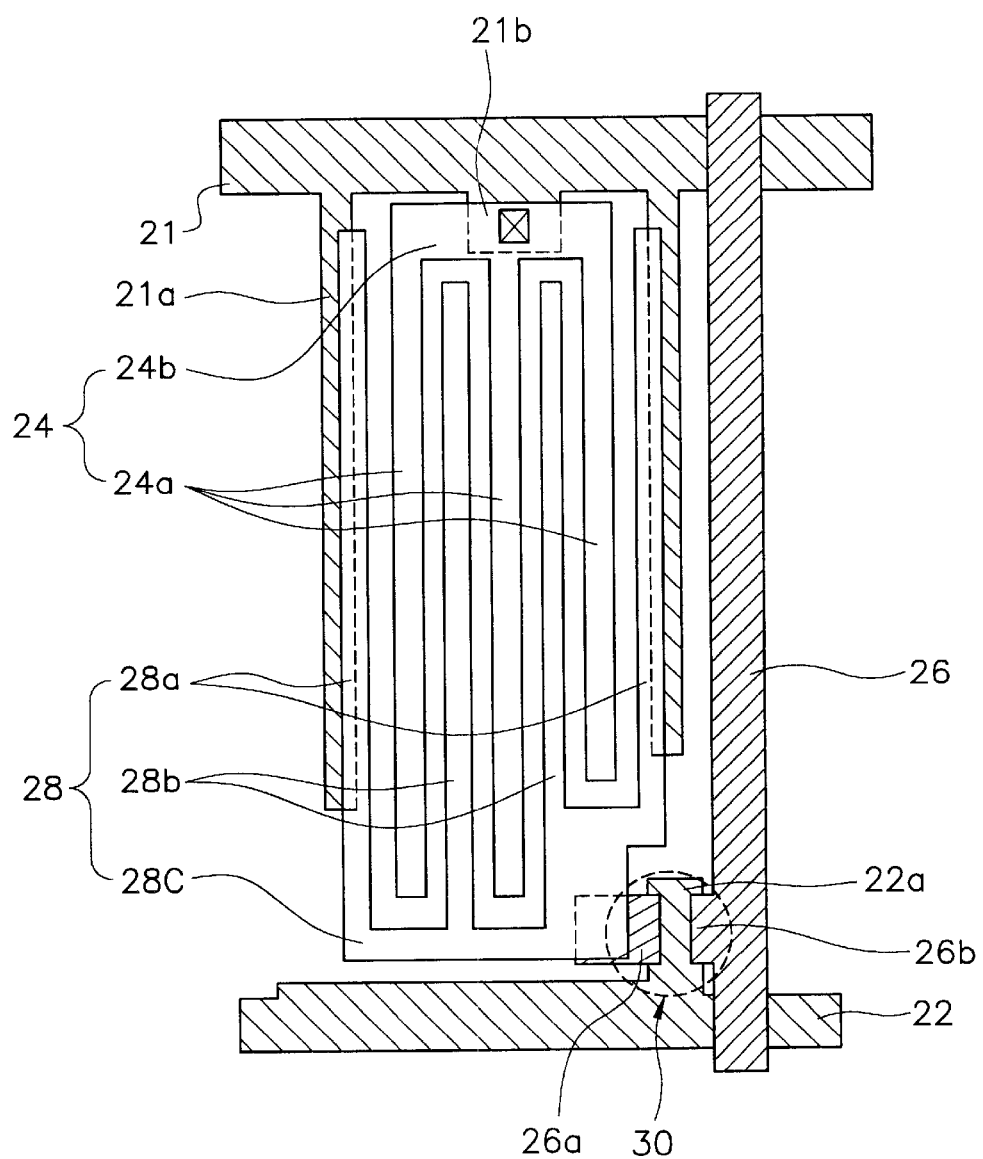
FIG. 3 is a plan view of an IPS mode LCD device according to an embodiment of the present invention.

FIG. 3 is a plan view of an IPS mode LCD device according to an embodiment of the present invention. As shown, a gate bus line 22 and a data bus line 26 are arranged in such a fashion that they cross each other, to define a unit pixel.

A common electrode line 21 extends in parallel to the gate bus line 22 while being spaced apart from the gate bus line 22 by a maximum distance in the unit pixel. The common electrode line 21 is arranged on the same plane as the gate bus line 22. Also, the common electrode line 21 is made of the same material as the gate bus line 22. The common electrode line 21 is provided with a pair of shields 21a which are branched from the common electrode line 21 while extending in parallel to the data bus line 26. The shields 21a are disposed at both lateral edges of the unit pixel, respectively. The common electrode line 21 has a protrusion 21b slightly extending toward the inside of the pixel.

A TFT 30 as a switching element is disposed near the intersection of the gate bus line 22 and the data bus line 26. The TFT 30 includes a gate electrode 22a extending from the gate bus line 22, a channel layer (not shown) arranged over the gate electrode 22a, a drain electrode 26b extending from the data bus line 26 while overlapping with one lateral portion of the channel layer, and a source electrode 26a overlapping with the other lateral portion of the channel layer. A counter electrode 24 is also disposed in the unit pixel. The counter electrode 24 includes a plurality of first branches 24a disposed in parallel to the data bus line 26 within a pixel region defined between the shields 21a of the common electrode line 21, and a bar 24bc connecting respective one-side ends of the branches 24a together while contacting the protrusion 21b of the common electrode line 21. The counter electrode 24 is made of a transparent conductive material, for example, an ITO.

A pixel electrode 28 is also disposed in the unit pixel. The pixel electrode 28 includes a pair of first electrode parts 28a overlapping with respective shields 21a of the common electrode line 21 while extending in parallel to the data bus line 26, second electrode parts 28b each interposed between adjacent ones of the branches 24a of the counter electrode 24, and a third electrode part 28c connecting together respective ends of the first and second electrode parts 28a and 28b arranged near the gate bus line 22 while contacting the source electrode 26a of the TFT 30.

Figure 4:
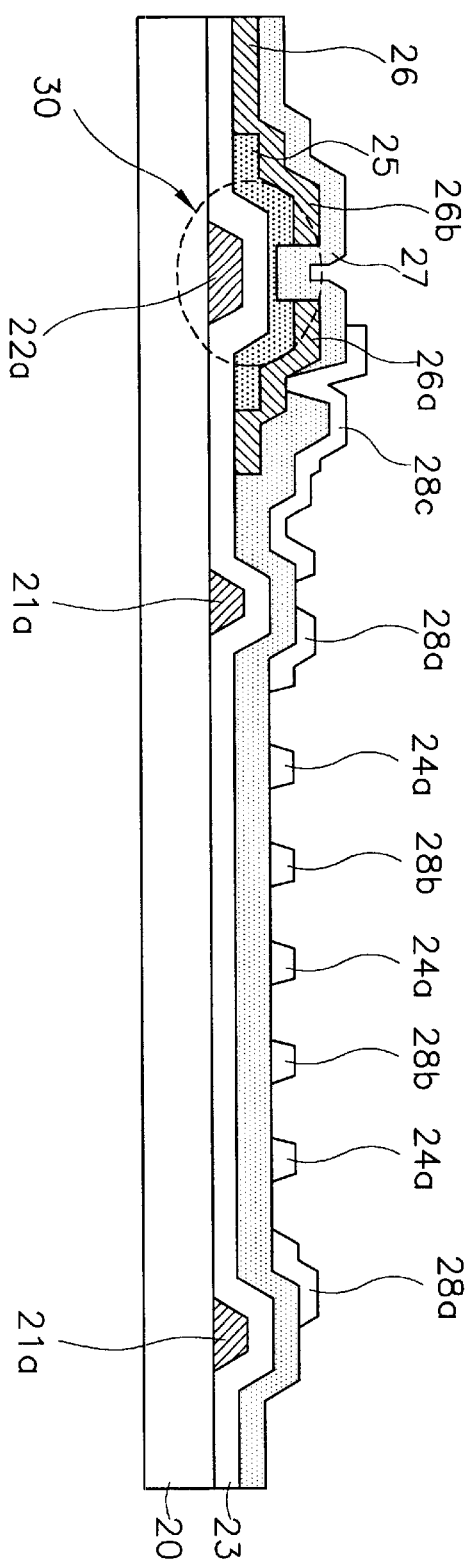
FIG. 4 is a cross-sectional view of the IPS mode LCD device according to the embodiment of the present invention.

FIG. 4 shows a cross-sectional view of the IPS mode LCD device according to the embodiment of the present invention. As shown, a first opaque metal film having a superior conductivity is deposited a transparent insulating substrate, for example a glass substrate 20, and then patterned according to a known photo process to form a common electrode line having a pair of shields 21a and a gate bus line having a gate electrode 22a. Over the resultant structure, a gate insulating film 23 is then formed.

A channel layer 25 made of an undoped amorphous silicon is formed on a portion of the gate insulating film 23 over the gate electrode 22a by a known method. A second opaque metal film for source/drain is deposited on the gate insulating film 23 including the channel layer, and then patterned according to the known photo process to form a data bus line having source/drain electrodes 26a and 26b. As such, a TFT 30 is constructed. Here, although not shown, an ohmic contact layer of a doped amorphous silicon is formed between the channel layer 25 and the source/drain electrodes 26a and 26b. A protection layer 27 such as a silicon nitride film is deposited over the resultant structure obtained after completion of the above process. Then, predetermined parts of the protection layer 27 are selectively subjected to an etching treatment so that the source electrode 26a of the TFT and the common electrode line are partially exposed.

As a transparent conductor, a film selected from a group consisting of an ITO film, an IXO film made of a mixture of $InO_3$ and $ZnO_3$, or an $NiSi_2$ film is deposited over the protection layer 27 to completely fill holes formed by the etching treatment. By patterning of the transparent conductor by the known photo process, a counter electrode is formed which has a plurality of branches 24a, and a bar connecting respective one-side ends of the branches 24a together. Simultaneously, a pixel electrode 28 is also formed which includes a pair of first electrode parts 28a overlapping with respective shields 21a of the common electrode line, second electrode parts 28b each interposed between adjacent ones of the branches 24a of the counter electrode, and a third electrode part 28c connecting together respective ends of the first and second electrode parts 28a and 28b arranged near the gate bus line while contacting the source electrode 26a of the TFT.

Here, the branches 24a of the counter electrode and the first and second electrode parts 28a and 28b of the pixel electrode are formed to have a width of not more than 10 μm, preferably 5 to 10 μm. Also, the branches 24a of the counter electrode and the first and second electrode parts 28a and 28b of the pixel electrode has a spacing of not more than 10 μm, preferably 5 to 10 μm.

The bar of the counter electrode is formed to contact the protrusion of the common electrode line through a hole formed on the protection layer 27. When an $NiSi_2$ film is used as the transparent conductor, the $NiSi_2$ film will be deposited to a thickness of not more than 100 Å, preferably 50 to 100 Å.

The IPS mode LCD device according to the present invention has not only an enhanced viewing angle, as compared to TN mode LCD devices, but also an improved aperture ratio and enhanced transmittance, as compared to those of the conventional IPS mode LCD device.

In detail, aperture ratio and transmittance depend on an opening area, that is, a light transmission area defined in the pixel. Up to now, since the counter electrode is formed of an opaque metal, the pixel area corresponding to the area of the counter electrode does not permit transmission of light. However, the counter electrode according to the present invention is formed of a transparent conductor, so that light can be transmitted through the counter electrode. Therefore, the IPS mode LCD device of the present invention has an aperture ratio and transmittance more improved than those of the prior art in that light is transmitted to the counter electrode part.

Figure 5:
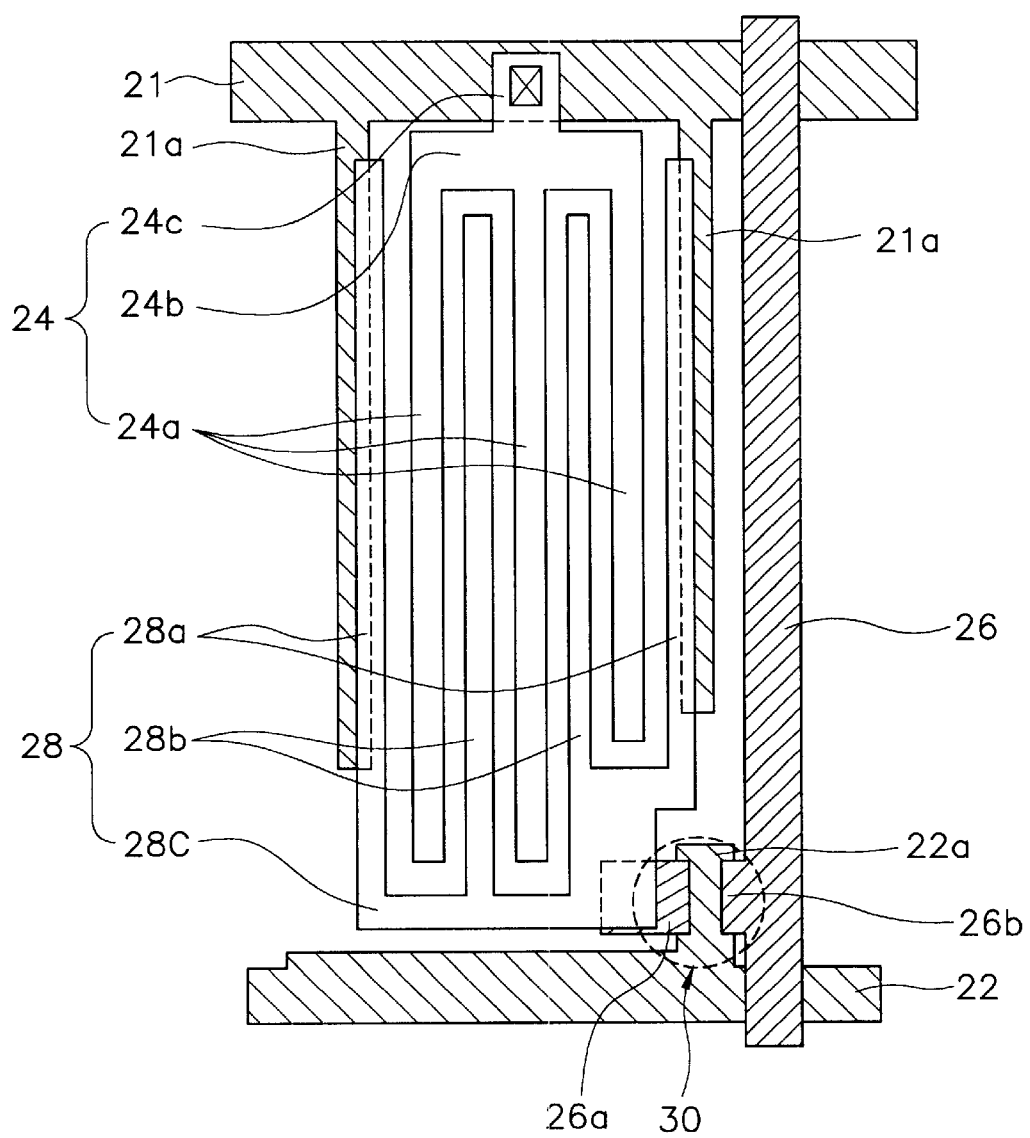
FIG. 5 is a plan view of an IPS mode LCD device according to another embodiment of the present invention.

FIG. 5 shows a plan view of an IPS mode LCD device according to another embodiment according to the present invention. In this embodiment, the common electrode line 21 does not have the protrusion 21b. In stead, the counter electrode 24 includes a protrusion 24c for easiness of an electrical contact with the common electrode line 21. Here, as the protrusion 24c is made of a transparent conductor, this embodiment exhibits an aperture ratio and transmittance better than the above embodiment.

As apparent from the above description, according to the present invention, the counter electrode is made of a transparent conductor, whereby the opening area in the pixel area is increased. Accordingly, it is possible to obtain an IPS mode LCD device having an improved aperture ratio and transmittance.

Further, according to the present invention, since there is no surface topology resulting from the counter electrode, the deposition process for the protection layer and the following rubbing process can be stably carried out. Thus, an enhance production yield may be achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed:

1. An in plane switching mode liquid crystal display device comprising:
    a transparent insulating substrate;
    a gate bus line and a data bus line arranged in a cross fashion on the transparent insulating substrate to define a unit pixel area;
    a common electrode line disposed in parallel to the gate bus line while being spaced at most apart from the gate bus line in the unit pixel area, the common electrode line having a pair of shields respective disposed at both lateral edges of the unit pixel area;
    a thin film transistor disposed near an intersection of the gate bus line and the data bus line;
    a counter electrode arranged in the unit pixel area between the shield of the common electrode line and made of a transparent conductor, the counter electrode including a plurality of branches arranged in parallel to the data bus line, and a bar contacting the common electrode line and connecting respective one-side ends of the branches together; and
    a pixel electrode formed of a transparent conductor and including a pair of first electrode parts respectively overlapping with the shields of the common electrode line while extending in parallel to the data bus line, second electrode parts interposed each between adjacent ones of the branches included in the counter electrode, and a third electrode part contacting a part of the thin film transistor while connecting together respective one-side ends of the first and second electrode parts.

2. The IPS mode LCD device according to claim 1, wherein the common electrode line further includes a protrusion contacting the bar of the counter electrode.

3. The IPS mode LCD device according to claim 1, wherein the bar of the counter electrode is provided with a protrusion contacting the common electrode line.

4. The IPS mode LCD device according to claim 1, wherein the branches of the counter electrode and the first and second electrode parts of the pixel electrode have a width of 5 to 10 μm.

5. The IPS mode LCD device according to claim 1, wherein the branches of the counter electrode and the first and second electrode parts of the pixel electrode have a spacing of 5 to 10 μm.

6. The IPS mode LCD device according to claim 1, wherein the transparent conductor is selected from a group consisting of an ITO film, an IXO film made of a mixture of $InO_3$ and $ZnO_3$, and an $NiSi_2$ film.

7. A method for manufacturing an in plane switching (IPS) mode LCD device comprising steps of:
    depositing a first opaque metal film over a transparent insulating substrate;
    patterning the first opaque metal film to form a gate bus line including a gate electrode and a common electrode line disposed in parallel to the gate bus line while being spaced at most apart from the gate bus line in a unit pixel and having a pair of shields disposed at both lateral edges of the unit pixel;

forming a gate insulating film on the transparent insulating substrate to cover the gate bus line and the common electrode line;

forming a channel layer on the gate insulating part over the gate electrode;

forming source/drain electrodes on the channel layer to form a thin film transistor (TFT) and to define a unit pixel, and forming a data bus line to be arranged in a cross fashion with respect to the gate bus line;

forming, on a structure obtained after completion of the formation of the source/drain electrodes and the data bus line, a protection layer having contact holes, through which the common electrode line and the thin film transistor are partially exposed, respectively;

depositing a transparent conductor on the protection layer; and patterning the transparent conductor to form a counter electrode including a plurality of branches arranged in parallel to the data bus line and a bar contacting the common electrode line and connecting respective one-side ends of the branches together, and a pixel electrode having a pair of first electrode parts overlapping the shields of the common electrode line while being parallel to the data bus line, second electrode parts each interposed between adjacent ones of the branches of the counter electrode, and a third electrode part connecting to respective one-side ends of the first and second electrode parts together and contacting a portion of the thin film transistor.

8. The method according to claim 7, wherein the common electrode line is formed to have a protrusion contacting the bar of the counter electrode.

9. The method according to claim 7, wherein the counter electrode is formed to have a protrusion contacting the common electrode line.

10. The method according to claim 7, wherein the transparent conductor is selected from a group consisting of an ITO film, an IXO film made of a mixture of $InO_3$ and $ZnO_3$, and an $NiSi_2$ film.

11. The method according to claim 10, wherein the $NiSi_2$ film is deposited to a thickness of 50 to 100 Å.

12. The method according to claim 7, wherein the branches of the counter electrode and the first and second electrode parts of the pixel electrode are formed to have a width of 5 to 10 µm.

13. The method according to claim 7, wherein the branches of the counter electrode and the first and second electrode parts of the pixel electrode have a spacing of 5 to 10 µm.

* * * * *